United States Patent
Kumai et al.

(10) Patent No.: US 9,437,190 B2
(45) Date of Patent: Sep. 6, 2016

(54) SPEECH RECOGNITION APPARATUS FOR RECOGNIZING USER'S UTTERANCE

(75) Inventors: Tomoyuki Kumai, Tokyo (JP); Toshiyuki Miyazaki, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 291 days.

(21) Appl. No.: 14/239,315

(22) PCT Filed: Aug. 31, 2012

(86) PCT No.: PCT/JP2012/005540
§ 371 (c)(1),
(2), (4) Date: Feb. 18, 2014

(87) PCT Pub. No.: WO2013/035293
PCT Pub. Date: Mar. 14, 2013

(65) Prior Publication Data
US 2014/0163987 A1 Jun. 12, 2014

(30) Foreign Application Priority Data

Sep. 9, 2011 (JP) ................. 2011-197625

(51) Int. Cl.
*G10L 15/00* (2013.01)
*G10L 15/04* (2013.01)
*G10L 15/187* (2013.01)
*G10L 15/08* (2006.01)

(52) U.S. Cl.
CPC ........ *G10L 15/187* (2013.01); *G10L 2015/086* (2013.01)

(58) Field of Classification Search
CPC ..... G10L 15/00; G10L 15/005; G10L 15/08; G10L 15/187; G10L 2015/00; G10L 2015/027; G10L 2015/06; G09B 17/00; G09B 17/006; G09B 19/00

USPC ....... 704/231, 236, 239, 243, 251, 252, 254; 434/156
See application file for complete search history.

(56) References Cited

U.S. PATENT DOCUMENTS 6,190,173 B1 * 2/2001 Jenkins et al. ................ 434/169
6,321,196 B1 * 11/2001 Franceschi .................... 704/243

(Continued)

FOREIGN PATENT DOCUMENTS

JP    09-179578 A    7/1997
JP    09-266510 A    10/1997

(Continued)

OTHER PUBLICATIONS

Supplementary European Search Report dated Apr. 28, 2015, for the corresponding European Patent Application No. 12830496.1 (Corrected issue date of ESR).

(Continued)

*Primary Examiner* — Paras D Shah
(74) *Attorney, Agent, or Firm* — Morgan, Lewis & Bockius LLP

(57) ABSTRACT

In accordance with alphabet input method information for each user, a word formed of an alphabet string is registered in a word dictionary, in a state where "dotto" being added before each alphabet and one of a set of alphabets difficult to distinguish from each other like "M and N" and "B and P" is repeated twice. For example, a word "PAM" and a feature of time series corresponding to "dotto P P doddo A dotto M" are registered in association with each other. When a user performs a speech input of "PAM", in accordance with the user's alphabet input method information, the user utters "dotto P P dotto A dotto M". A speech recognition is performed on this sound data using the word dictionary corresponding to the user's alphabet input method information.

12 Claims, 13 Drawing Sheets

(56) References Cited

U.S. PATENT DOCUMENTS

| | | | |
|---|---|---|---|
| 7,143,037 B1* | 11/2006 | Chestnut | 704/251 |
| 2002/0032567 A1* | 3/2002 | Lindholm et al. | 704/246 |
| 2002/0184035 A1* | 12/2002 | Hartley et al. | 704/275 |
| 2003/0216918 A1* | 11/2003 | Toyama | G10L 15/22 704/254 |
| 2004/0236581 A1* | 11/2004 | Ju et al. | 704/276 |
| 2005/0203742 A1 | 9/2005 | Rao | |
| 2006/0111907 A1* | 5/2006 | Mowatt et al. | 704/257 |
| 2006/0183090 A1* | 8/2006 | Nollan et al. | 434/178 |
| 2008/0177543 A1* | 7/2008 | Nagano et al. | 704/253 |
| 2011/0208513 A1* | 8/2011 | Nicks | G06F 17/2705 704/10 |
| 2013/0209970 A1* | 8/2013 | Serman | G09B 5/04 434/116 |

FOREIGN PATENT DOCUMENTS

| | | |
|---|---|---|
| JP | 11-088507 A | 3/1999 |
| JP | 11-167393 A | 6/1999 |
| JP | 2004-170466 A | 6/2004 |
| JP | 2007-535692 A | 12/2007 |

OTHER PUBLICATIONS

International Preliminary Report on Patentability dated Mar. 20, 2014, for the corresponding International Application No. PCT/JP2012/005540.

Supplementary European Search Report dated Apr. 15, 2015, for the corresponding European Patent Application No. 12830496.1.

* cited by examiner

K pub    K

FIG. 15

SINGLE ALPHABETICAL CHARACTER, NO WORD ADDED BEFORE THE CHARACTER

| UTTERER | FIRST CANDIDATE | SECOND CANDIDATE |
|---|---|---|
| FEMALE 1 | 96.15 | 100.00 |
| FEMALE 2 | 96.15 | 96.15 |
| FEMALE 3 | 92.31 | 96.15 |
| FEMALE 4 | 76.92 | 92.31 |
| FEMALE 5 | 92.31 | 100.00 |
| MALE 1 | 92.31 | 96.15 |
| MALE 2 | 84.62 | 92.31 |
| MALE 3 | 88.46 | 96.15 |
| MALE 4 | 96.15 | 96.15 |
| MALE 5 | 96.15 | 100.00 |
| AVERAGE RECOGNITION RATE | 91.15 | 96.54 |

FIG. 16

SINGLE ALPHABETICAL CHARACTER, "DOTTO" ADDED BEFORE THE CHARACTER

| UTTERER | FIRST CANDIDATE | SECOND CANDIDATE |
|---|---|---|
| FEMALE 1 | 100.00 | 100.00 |
| FEMALE 2 | 96.15 | 100.00 |
| FEMALE 3 | 96.15 | 100.00 |
| FEMALE 4 | 96.15 | 100.00 |
| FEMALE 5 | 88.46 | 96.15 |
| MALE 1 | 84.62 | 100.00 |
| MALE 2 | 80.77 | 100.00 |
| MALE 3 | 100.00 | 100.00 |
| MALE 4 | 96.15 | 100.00 |
| MALE 5 | 100.00 | 100.00 |
| AVERAGE RECOGNITION RATE | 93.85 | 99.62 |

FIG. 17

TWO ALPHABETICAL CHARACTERS, NO WORD ADDED BEFORE THE CHARACTERS

| UTTERER | FIRST CANDIDATE | SECOND CANDIDATE |
|---|---|---|
| MALE 1 | 79.00 | 90.00 |
| MALE 2 | 77.00 | 91.00 |
| MALE 3 | 76.00 | 90.00 |
| AVERAGE RECOGNITION RATE | 77.33 | 90.33 |

FIG. 18

TWO ALPHABETICAL CHARACTERS, "DOTTO" ADDED BEFORE THE CHARACTERS

| UTTERER | FIRST CANDIDATE | SECOND CANDIDATE |
|---|---|---|
| MALE 1 | 94.00 | 98.00 |
| MALE 2 | 84.00 | 99.00 |
| MALE 3 | 88.00 | 96.00 |
| AVERAGE RECOGNITION RATE | 88.67 | 97.67 |

FIG. 19 one alphabetical character

|  | none | pub |
|---|---|---|
| candidate 1 | 65.38(%) | 84.62(%) |
| candidate 2 | 76.92(%) | 88.46(%) |
| candidate 3 | 80.77(%) | 96.15(%) |
| candidate 4 | 92.31(%) | 96.15(%) |
| candidate 5 | 92.31(%) | 96.15(%) |

FIG. 20 two alphabetical character

|  | none | pub |
|---|---|---|
| candidate 1 | 36.67(%) | 70.00(%) |
| candidate 2 | 63.33(%) | 80.00(%) |
| candidate 3 | 70.00(%) | 80.00(%) |
| candidate 4 | 76.67(%) | 83.33(%) |
| candidate 5 | 76.67(%) | 83.33(%) |

FIG. 21 one alphabetical character

|  | none | dian |
|---|---|---|
| candidate 1 | 61.54(%) | 73.08(%) |
| candidate 2 | 69.23(%) | 80.77(%) |
| candidate 3 | 76.92(%) | 84.62(%) |
| candidate 4 | 80.77(%) | 92.31(%) |
| candidate 5 | 84.62(%) | 96.15(%) |

FIG. 22 two alphabetical character

|  | none | dian |
|---|---|---|
| candidate 1 | 43.00(%) | 56.00(%) |
| candidate 2 | 55.00(%) | 70.00(%) |
| candidate 3 | 60.00(%) | 73.00(%) |
| candidate 4 | 65.00(%) | 74.00(%) |
| candidate 5 | 66.00(%) | 76.00(%) |

SPEECH RECOGNITION APPARATUS FOR RECOGNIZING USER'S UTTERANCE

TECHNICAL FIELD

The present invention relates to a speech recognition apparatus.

BACKGROUND ART

There is a demand from workers of services, such as commodity distribution and medical services, to make the operations efficient and to realize hands-free operations through speech recognition.

In particular, in the services, such as the commodity distribution and medical services, inputting of character strings, such as the model number of a product and an ID of a product, having alphabets and numbers mixed is necessary in many cases. Hence, an excellent speech recognition accuracy for alphabets and numbers and a small number of false recognition remarkably contribute to the improvement of the efficiency of the services through the speech recognition.

However, an utterance of an alphabet is very short in particular, and alphabets have similar pronunciation with each other. Accordingly, it is difficult to precisely distinguish from each character.

For example, in the case of "C", "E", "T" and the like, a major part of the portion where utterance energy is intensive is a long vowel "i:" of the end of the utterance, and it is difficult even for a human to distinguish among them.

In particular, consonants are mixed with noises in an environment where noises are always present, such as a warehouse and a factory, and become unclear, and thus the recognition of the alphabets becomes further difficult.

Hence, according to the conventional method, for each alphabet, an English word beginning from that alphabet, such as A: alpha, B: bravo, and C: Charlie, is allocated, and the pronunciations of the words are registered in a speech recognition apparatus. A user utters those allocated English words so as to obtain alphabets corresponding to those English words.

In addition, a method for recognizing alphabets has been proposed, in which a user sequentially utters a given alphabet and another alphabet following the given alphabet in the alphabetic order (see, for example, Patent Literature 1, hereinafter, Patent Literature is referred to as "PTL").

According to this method, "ADC" is read as "AB DE CD", for example.

The above method intends to improve the recognition rate in comparison with a case of a single alphabet by utilizing the fact that the acoustic feature of an utterance becomes large when two alphabets are combined.

CITATION LIST

Patent Literature

PTL 1: JP H11-167393 A

SUMMARY OF INVENTION

Technical Problem

However, according to the method allocating for each alphabet an English word beginning from the alphabet, the user is needed to learn English words corresponding to 26 respective alphabets. That is, in order to input speech more quickly, it is necessary for the user to memorize the English words corresponding to the respective alphabets. The above memorizing requires time and increases the training costs.

In addition, in the case of the method allocating for each alphabet the English word beginning from that alphabet, it is always necessary for the user to image a next alphabet while uttering, and to keep uttering while recalling the English word corresponding to the next alphabet.

Still further, according to the method in which a user sequentially utters a given alphabet and another alphabet following the given alphabet in the alphabetic order, "ADC" is read as "AB DE CD". However, false utterance often occurs, such as, "D" is uttered immediately after "A", or the user cannot utter a next alphabet to be subsequent to the given alphabet promptly and stammers.

Hence, in order to input alphabets always correctly, it is necessary for the user to maintain a concentration so as not to cause such false utterance, which is a large burden to the user.

Therefore, it is an objective of the present invention to provide a speech recognition apparatus which contributes to the improvement of a speech recognition accuracy and which is suitable for reducing the burden to an utterer.

Solution to Problem

According to an aspect of the present invention, there is provided s speech recognition apparatus that includes a recognition dictionary and a speech recognition processor configured to perform a speech recognition process using the recognition dictionary. A recognition data is registered in the recognition dictionary, the recognition data including a target character to be recognized and information on sound data in association with each other, the sound data representing a pronunciation of a successive character string including a predetermined character string and the target character subsequent to the predetermined character string. The predetermined character string enhances sound energy of a first phoneme of the target character when the successive character string is uttered.

The predetermined character string may be a Japanese character string a pronunciation of which has three or more moras including "tto" as last two moras.

The predetermined character string may be an English character string a pronunciation of which is formed of a consonant, a vowel, and a consonant in this order.

The predetermined character string may be a Chinese character string a pronunciation of which is classified into a third tone of Chinese tones, and has a single syllable.

The recognition data is registered in the recognition dictionary, the recognition data including the target character and the information on the sound data in association with each other, the sound data representing the pronunciation of the successive character string including the predetermined character string and a predetermined number of repetitions of the target characters subsequent to the predetermined character string.

The target character may be an alphabet.

Advantageous Effects of Invention

According to an aspect of the present invention, the recognition data is registered in the recognition dictionary, the recognition data including the target character to be recognized and the information on the sound data in association with each other, the sound data representing the pronunciation of a successive character string including the predetermined character string and the target character subsequent to the predetermined character string, and a character string that enhances the sound energy of the first phoneme of the target character is set as the predetermined character string. When a user utters the target character added with the predetermined character string before the target character, it becomes easy to extract the acoustic feature of the target character, therefore, the recognition rate of the target character is improved.

In addition, when the added predetermined character string is a Japanese character string a Japanese pronunciation of which has three or more moras including "tto" as the last two moras, such as "dotto" or "atto", it becomes easy to enhance the sound energy of the first phoneme of the target character when uttered.

Still further, when the added predetermined character string is an English character string an English pronunciation of which is formed of a consonant, a vowel, and a consonant in this order, such as "dot", "pub", "pot" or "dub", it becomes easy to enhance the sound energy of the first phoneme of the target character string when uttered.

When the added predetermined character string is a Chinese character string a Chinese pronunciation of which is classified into the third tone of Chinese tones and has a single syllable, such as "dian", "jian", or "dang", it becomes easy to enhance the sound energy of the first phoneme of the target character when uttered.

In addition, by not only adding the predetermined character string, but also utilizing the recognition dictionary corresponding to the successive character string including the reputations of the target character, even in the case of the target characters difficult to distinguish from each other, one of the target characters is repeated successively to facilitate the extraction of the acoustic feature. Therefore, it becomes easy to distinguish the characters difficult to distinguish from one another, thus the recognition rate is improved.

Moreover, according to another aspect of the present invention, the predetermined character string is added to an alphabet. An utterance of an alphabet is short and many alphabets have the similar pronunciation to that of another alphabet. However, when the predetermined character string is added to the alphabet, it becomes easy to extract the acoustic feature of the alphabet, thus the recognition rate is improved.

BRIEF DESCRIPTION OF DRAWINGS

FIG. 15 illustrates an example of a recognition rate when one alphabetical character is uttered;

FIG. 16 illustrates an example of a recognition rate when one alphabetical character added with "dotto" before the alphabetical character is uttered;

FIG. 17 illustrates an example of a recognition rate when two alphabetical characters are uttered successively;

FIG. 18 illustrates an example of a recognition rate when two alphabetical characters added with a "dotto" before each of the alphabetical characters are uttered successively;

FIG. 19 is a diagram illustrating recognition rates of first to fifth candidates when one native English speaker from North America utters one alphabetical character without adding anything before the alphabetical character, and when the speaker utters the alphabetical character added with a "pub" before the alphabetical character;

FIG. 20 is a diagram illustrating recognition rates of first to fifth candidates when one native English speaker from North America utters two alphabetical characters without adding anything before the alphabetical characters, and when the speaker utters the alphabetical characters added with a "pub" before the alphabetical characters;

FIG. 21 is a diagram illustrating recognition rates of first to fifth candidates when one native Mandarin speaker from China utters one alphabetical character without adding anything before the alphabetical character, and when the speaker utters the alphabetical character added with a "dian" before the alphabetical character;

FIG. 22 is a diagram illustrating recognition rates of first to fifth candidates when one native Mandarin speaker from China utters two alphabetical characters without adding anything before the alphabetical characters and when the speaker utters the two alphabetical characters added with a "dian" before the alphabetical characters.

DESCRIPTION OF EMBODIMENTS

An embodiment of the present invention will be below explained with reference to the accompanying drawings.

Figure 1:
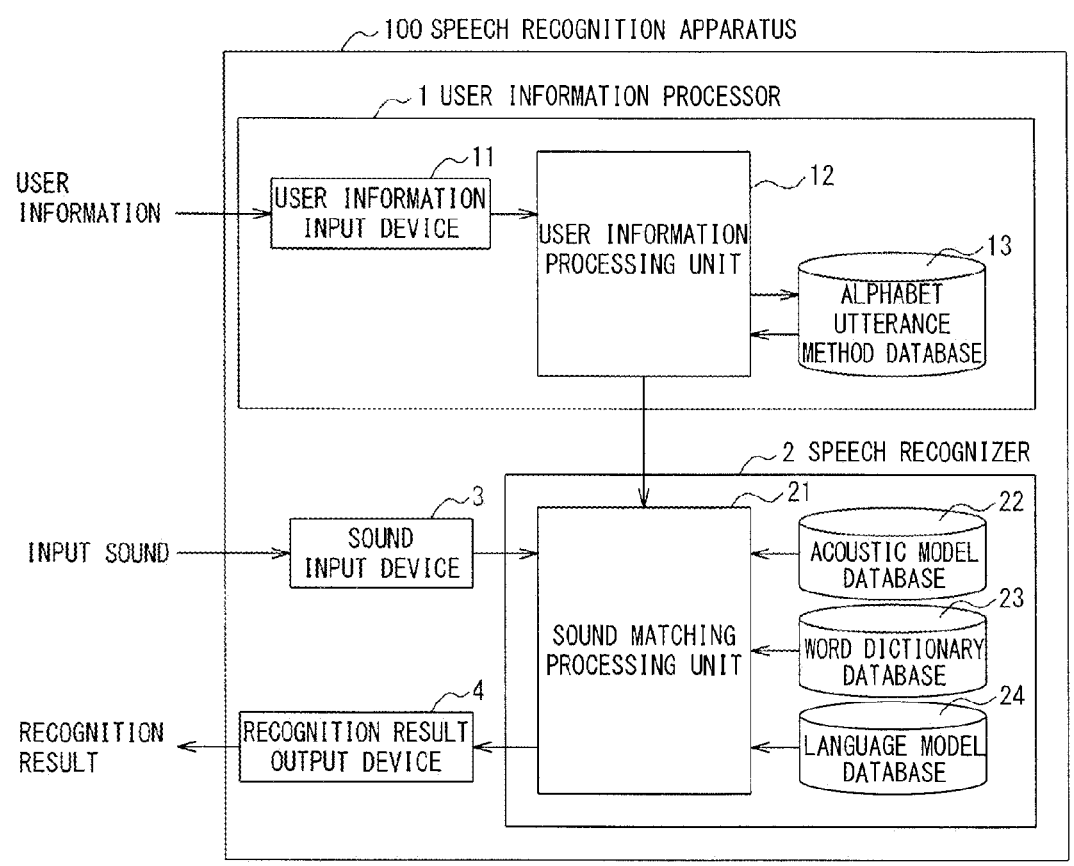
FIG. 1 is a schematic configuration diagram illustrating an example of a speech recognition apparatus of the present invention.

FIG. 1 is a schematic configuration diagram illustrating an example of a speech recognition apparatus 100 according to an embodiment of the present invention.

The speech recognition apparatus 100 is realized by, for example, a personal computer, and includes a user information processor 1, a speech recognizer 2, a sound input device 3, and a recognition result output device 4.

The user information processor 1 includes a user information input device 11, a user information processing unit 12, and an alphabet utterance method database 13.

The user information input device 11 is for a login operation to the speech recognition apparatus 100, and for an inputting of user information, etc., and is realized by, for example, a keyboard. The user information is to identify a user subjected to a speech recognition, and includes, for example, a user ID.

The user information processing unit 12 takes the user information as an input from the user information input device 11, and reads various pieces of information corresponding to the user information from the alphabet utterance method database 13. In the alphabet utterance method database 13, alphabet input method information is stored for each user ID. The alphabet input method information represents an input method through which the user specified by the user ID inputs alphabets. The alphabet input method information will be explained in detail later.

The user information processing unit 12 reads, from the alphabet utterance method database 13, the alphabet input method information corresponding to the user information inputted from the user information input device 11, and outputs the alphabet input method information to a sound matching processing unit 21 of the speech recognizer 2 to be discussed later.

The speech recognizer 2 includes the sound matching processing unit 21, an acoustic model database 22, a word dictionary database 23, and a language model database 24.

The sound matching processing unit 21 takes sound data as an input from the sound input device 3, and performs speech recognition on the inputted sound data based on the acoustic model, the word dictionary, and the language model stored in the acoustic model database 22, the word dictionary database 23, and the language model database 24, respectively, and outputs a speech recognition result to the recognition result output device 4.

In the word dictionary database 23, a character string representing an arbitrary word and a feature of the time series of the acoustic models corresponding to the character string is stored in association with each other as a word dictionary. In addition, with respect to an arbitrary word formed of an alphabet string, or an arbitrary word including an alphabet, a preset word, e.g., "dotto" is added before each alphabet in the arbitrary word, and a feature of a time series of acoustic models representing the arbitrary word added with a preset word is stored in association with the arbitrary word.

For example, in the case of a word "ADC", a feature of a time series of acoustic models corresponding to "dotto A dotto D dotto C", and the word "ADC" are stored in association with each other. The alphabet string in this embodiment means not an English word, but a sequence of alphabets uttered for each alphabet and representing a single word.

Still further, a feature of the acoustic models corresponding to "dotto N N" for "N", and a feature of the acoustic models corresponding to "dotto P P" for "P" are stored in association with the arbitrary word. In the case of a word "PM", for example, the feature of time series of the acoustic models corresponding to "dotto PP dotto M" and a word "PM" are stored in association with each other. The settings of the kind of a word added before these alphabets and of the features with respect to the alphabets "N" and "P" are set in accordance with the alphabet input method information of each user utilizing the speech recognition apparatus 100.

The sound input device 3 includes a sound pickup device like a microphone. The sound input device 3 converts uttered sound into an analog electric signal corresponding to the sound, converts the analog signal into the digital signal through an A/D converter, not illustrated, and outputs the digital signal to the speech recognizer 2 as sound data.

The recognition result output device 4 includes, for example, a display device, and displays a speech recognition result by the speech recognizer 2, that is, the character string corresponding to the inputted sound data.

Next, an explanation will be given of a principle of an alphabet inputting method and an alphabet recognition method by the present speech recognition apparatus 100.

When the present speech recognition apparatus 100 takes an alphabet as an input, the alphabet added with a preset word before the alphabet are inputted. As the preset word added before the alphabet, a word capable of enhancing the sound energy of the first phoneme of the alphabet may be preset.

As the above preset word, a Japanese character string a Japanese pronunciation of which has three or more moras including a double consonant "tto" as the last two moras, may be preset.

In addition, as the above preset word, an English character string an English pronunciation of which is formed of a consonant, a vowel, and a constant in this order may be preset, or a Chinese character string a pronunciation of which is classified into the third tone of Chinese tones and has a single syllable may be preset.

(Explanation for Mora)

A term "mora" is a unit of segment of sound, and represents as to how many "Haku" s is necessary to read a phrase. For example, in Japanese pronunciation, a Japanese word "NASU" has two moras, "KABOCHA" has three moras, and a "RAKKASEI" has five moras.

(Explanation for Chinese Tone)

Figure 2:
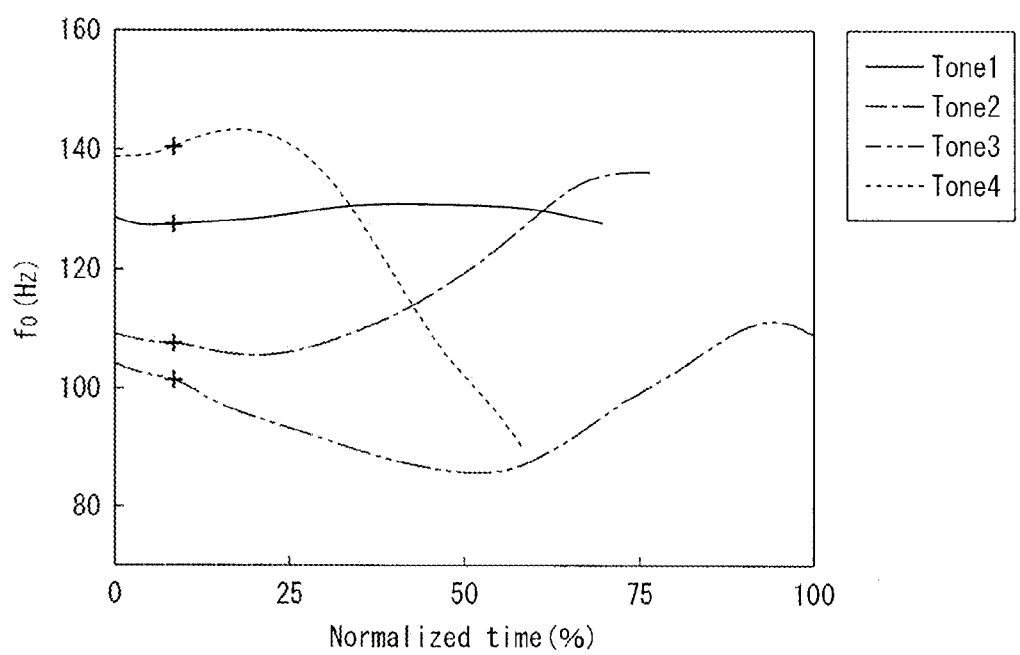
FIG. 2 is a diagram illustrating a pattern of each tone in Chinese.

A so-called tonal language like Chinese distinguishes the meaning of a word using a tone. For example, as illustrated in FIG. 2, Chinese basically has four tones (the first tone to the fourth tone: Tone 1 to Tone 4, respectively). The horizontal axis in FIG. 2 represents a normalized time, and the vertical axis represents a basic frequency (f0) extracted from inputted sound. The pronunciations of numbers "1", "3", "7", and "8" out of the numbers "0" to "9" in Chinese are classified into the first tone (Tone 1), the pronunciation of "0" is classified into the second tone (Tone 2), the pronunciations of "5" and "9" are classified into the third tone (Tone 3), and the pronunciations of "0", "2", "4", and "6" are classified into the fourth tone (Tone 4).

The basic frequency (f0) of the third tone is lower than those of the other tones, and decreases right after an utterance, and then increases.

As specific words being commonly added to each alphabet and capable of enhancing the sound energy of the first phoneme of the alphabet as described above, the words "dotto", "atto", "alphabet", "pub", and "pot" are applicable, in addition, "dian", "jian", and "dang" read with Chinese pronunciation are applicable.

When, for example, a word "dotto" is adopted as a word commonly added to each alphabet, "ADC" is read as "dotto A dotto D dotto C".

In general, when a word such as "dotto", which enhances the sound energy of the first phoneme of the alphabet is added before the alphabet, a portion "tto" added before the alphabet is intensively uttered, and then the first phoneme of the alphabet following "tto" is likely to be uttered intensively while maintaining the intensity of the added word.

When a word, such as "pub" or "pot" is added before an alphabet, or a word "dian" read with Chinese pronunciation is added before an alphabet, the end of the added word is also uttered intensively, and the first phoneme of the alphabet following the added word is likely to be uttered intensively while maintaining the intensity of the added word.

The first phoneme of the alphabet is an effective part to distinguish respective alphabets in an acoustic manner, and when this part is intensively and clearly uttered, it becomes easy to extract an acoustic feature. Therefore, the utterance of the alphabet added with such a word before the alphabet improves the recognition rate of the alphabet.

When the utterances of alphabets are successive, the utterance of a transition part from the former alphabet to the next alphabet is likely to be deformed, or becomes unclear.

For example, "NHK (registered trademark)" and "SI" have respective original pronunciations that are "én éɪtʃ kéɪ" and "és ɑɪ", but in actual utterances, those become close to pronunciations that are "énétʃkéɪ" and "ésɑɪ", respectively.

In addition, for example, "AM" has its original pronunciation that is "éɪ ém", but in reality, "é" at the beginning of "M" is not easy to utter, and the actual pronunciation becomes close to "éɪm" having the part of "éɪ" elongated.

The so-called broken alphabet utterance is different from the normal alphabet pronunciation that is learned in the acoustic model utilized by the sound recognizer 2, and thus the broken alphabet utterance becomes a cause of a recognition error.

In this embodiment, by uttering the alphabets added with a common word before each alphabet, the utterances of the alphabets become non-continuous. Therefore, it becomes easier to utter for each alphabet.

That is, the uttered sound becomes close to the alphabet pronunciation learned in the acoustic model, and thus the recognition rate of the alphabet improves.

Figure 3:
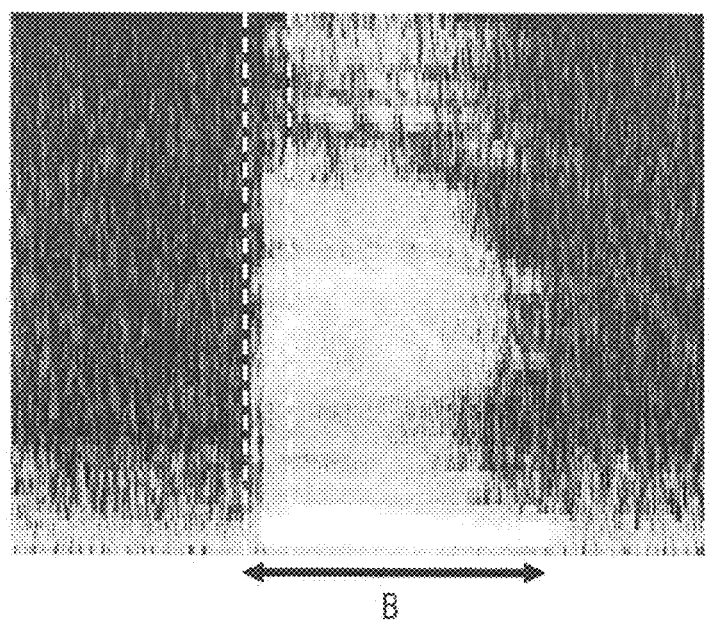
FIG. 3 is an example of a spectrogram of a sound of an alphabet "B" uttered by a Japanese whose native language is Japanese.
Figure 4:
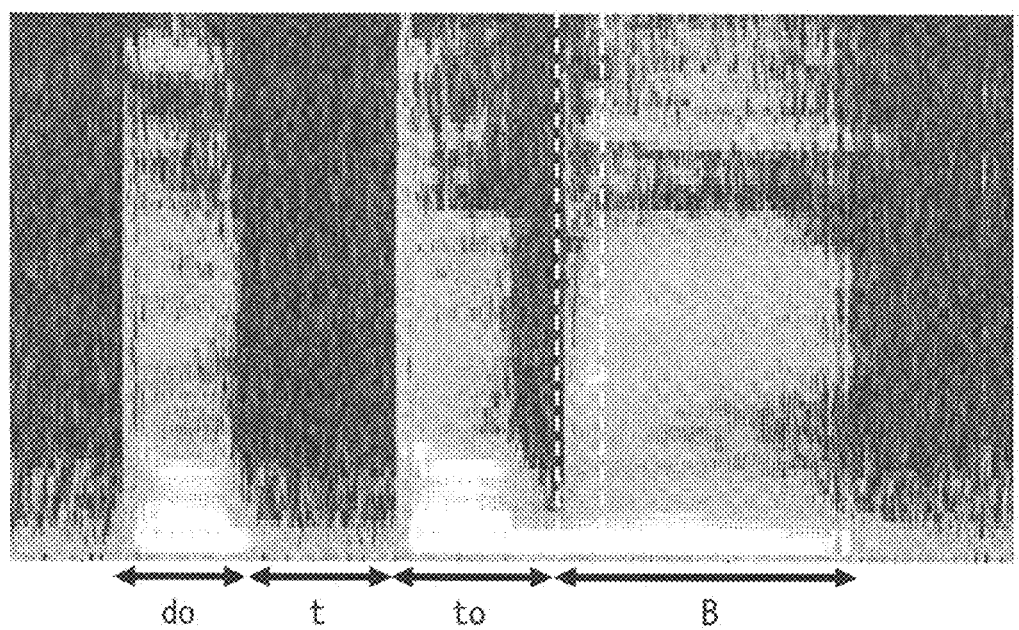
FIG. 4 is an example of a spectrogram of a sound of the alphabet "B" added with "dotto" before the alphabet "B", uttered by a Japanese whose native language is Japanese.

FIG. 3 is a spectrogram of a sound of an alphabet "B" uttered by a Japanese whose native language is Japanese, when the Japanese utters "B" without adding anything before the alphabet. Moreover, FIG. 4 is a spectrogram of a sound of "dotto B" uttered by the same person in FIG. 3, by adding "dotto" before the alphabet "B". Both FIGS. 3 and 4 have a horizontal axis representing a time and a vertical axis representing a frequency. In addition, the brightness represents an intensity.

Figure 5:
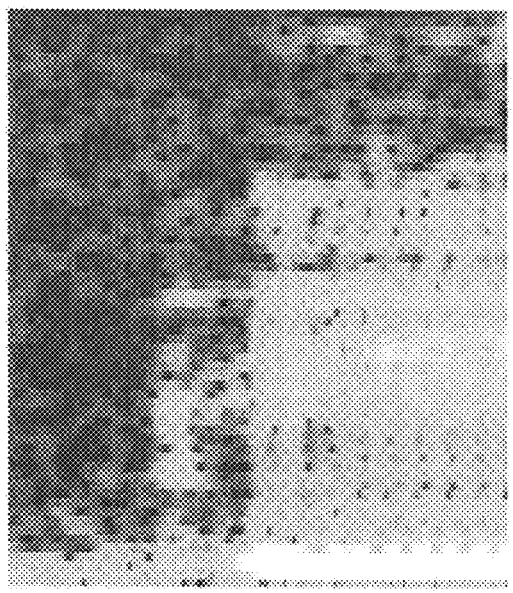
FIG. 5 is an enlarged diagram of a head element part of the alphabet "B" illustrated in FIG. 3.
Figure 6:
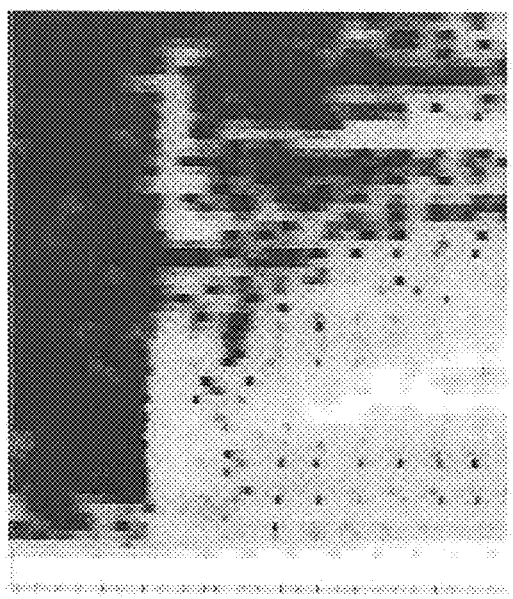
FIG. 6 is an enlarged diagram of a head element part of the alphabet "B" illustrated in FIG. 4.

In FIGS. 3 and 4, the areas surrounded by dotted lines represent the consonant part of "B". FIGS. 5 and 6 illustrate the areas surrounded by the dotted lines in an enlarged manner. FIG. 5 illustrates the area surrounded by the dotted lines in FIG. 3 in an enlarged manner, while FIG. 6 illustrates the area surrounded by the dotted lines in FIG. 4 in an enlarged manner.

When the areas surrounded by the dotted lines in FIGS. 3 and 4, that is, the respective consonant parts of "B" are compared, as is clear from FIGS. 5 and 6, FIG. 6 has a clearer contrast between the black part and the white part, and the spectrum of the consonant part is sharp. That is, it can be understood that the consonant part is pronounced more intensively.

Accordingly, it can be understood that, when a Japanese character string a Japanese pronunciation of which has three or more moras including a last part ending as "tto" is added before the alphabet, the pronunciation of the first phoneme of the alphabet is uttered clearly.

Figure 7:
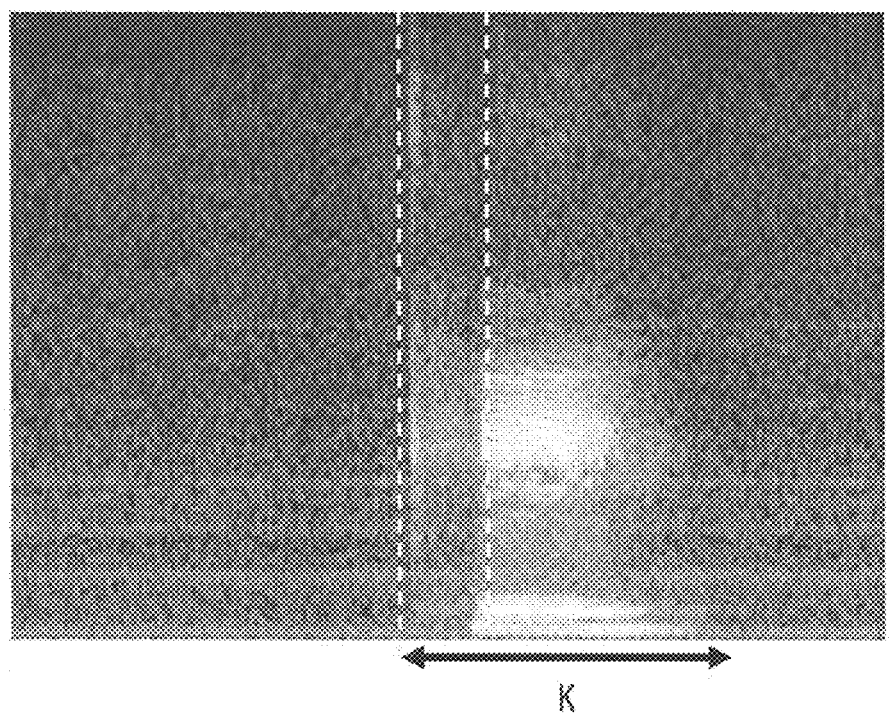
FIG. 7 is an example of a spectrogram of a sound of an alphabet "K" uttered by a native English speaker from North America.
Figure 8:
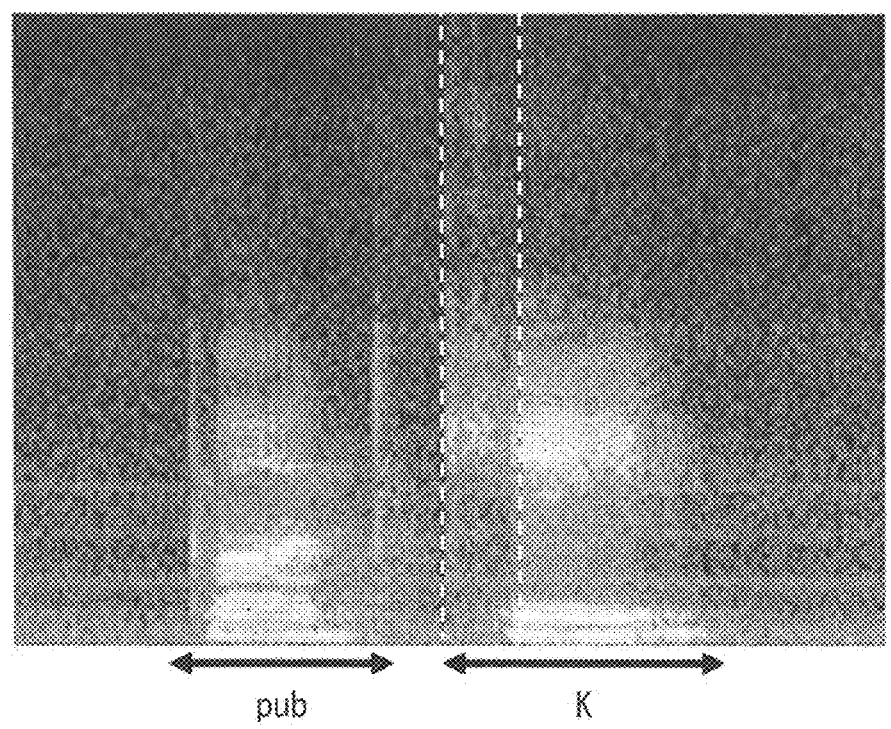
FIG. 8 is an example of a spectrogram of a sound of the alphabet "K" added with "pub" before the alphabet "K", uttered by a native English speaker from North America.

FIG. 7 is a spectrogram of a sound of an alphabet "K" uttered by a native English speaker from North America, when the speaker utters "K" without adding anything before the alphabet. In addition, FIG. 8 is a spectrogram of a sound of "pub K" uttered by the same person in FIG. 7, by adding "pub" before the alphabet "K". Both FIGS. 7 and 8 have a horizontal axis representing a time, and a vertical axis representing a frequency. In addition, the brightness represents an intensity.

Figure 9:
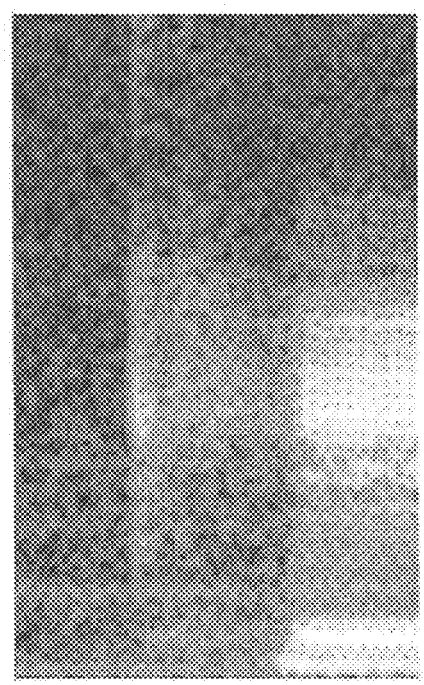
FIG. 9 is an enlarged diagram of a head element part of the alphabet "K" illustrated in FIG. 7.
Figure 10:
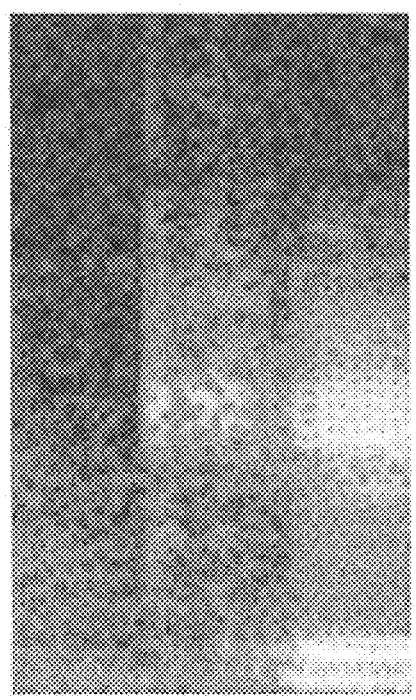
FIG. 10 is an enlarged diagram of a head element part of the alphabet "K" illustrated in FIG. 8.

In FIGS. 7 and 8, the areas surrounded by the dotted lines represent the consonant part of "K". FIGS. 9 and 10 illustrate the areas surrounded by the dotted lines in an enlarged manner. FIG. 9 illustrates the area surrounded by the dotted lines in FIG. 7 in an enlarged manner, while FIG. 10 illustrates the area surrounded by the dotted lines in FIG. 8 in an enlarged manner.

When the areas surrounded by the dotted lines in FIGS. 7 and 8, that is, the respective consonant parts of "K" are compared, as is clear from FIGS. 9 and 10, FIG. 10 has a clearer contrast between the black part and the white part, and the spectrum of the consonant part is sharp. That is, it can be understood that the consonant part is pronounced more intensively.

Accordingly, it can be understood that, when a word a pronunciation of which is formed by a consonant, a vowel, and a consonant in this order, is added before the alphabet, the pronunciation of the first phoneme of the alphabet is uttered clearly.

Figure 11:
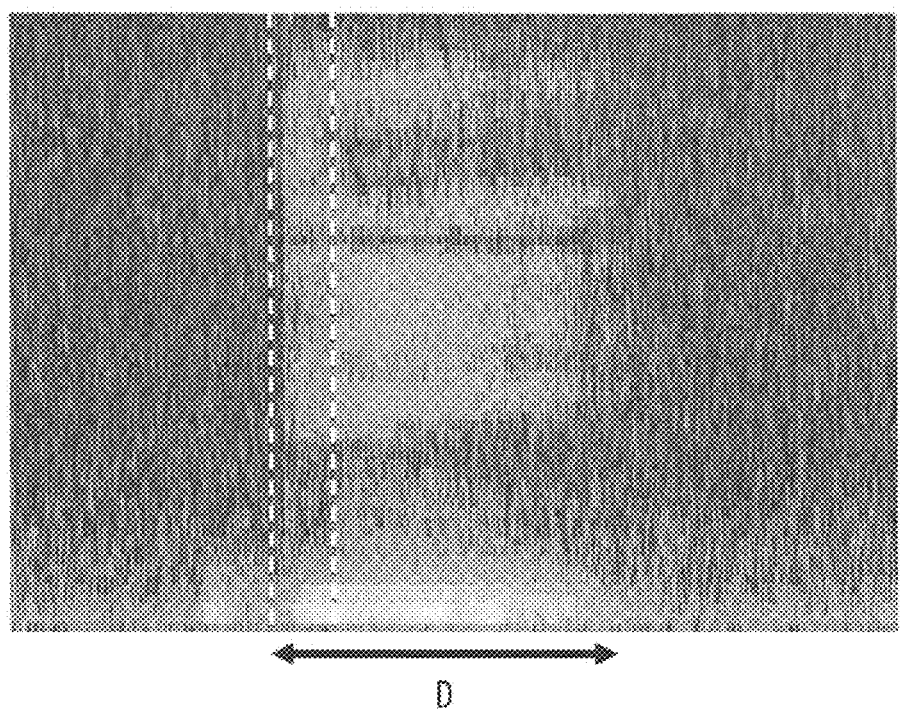
FIG. 11 is an example of a spectrogram of a sound of an alphabet "D" uttered by a native Mandarin speaker from China.
Figure 12:
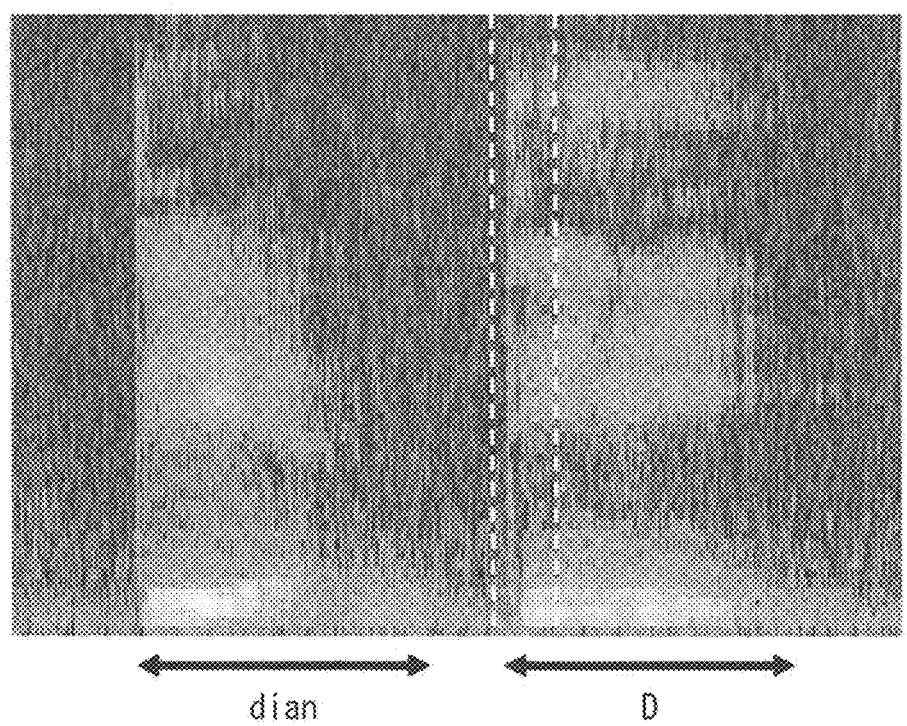
FIG. 12 is an example of a spectrogram of a sound of the alphabet "D" added with "dian" before the alphabet "D", uttered by a native Mandarin speaker from China.

FIG. 11 is a spectrogram of a sound of an alphabet "D" uttered by a native Mandarin speaker from China, when the speaker utters "D" without adding anything before the alphabet. Moreover, FIG. 12 is a spectrogram of a sound of "dian D" uttered by the same person in FIG. 11, by adding "dian" before the alphabet "D". Both FIGS. 11 and 12 have a horizontal axis representing a time, and a vertical axis representing a frequency. In addition, the brightness represents an intensity.

Figure 13:
FIG. 13 is an enlarged diagram of a head element part of the alphabet "D" illustrated in FIG. 11.
Figure 14:
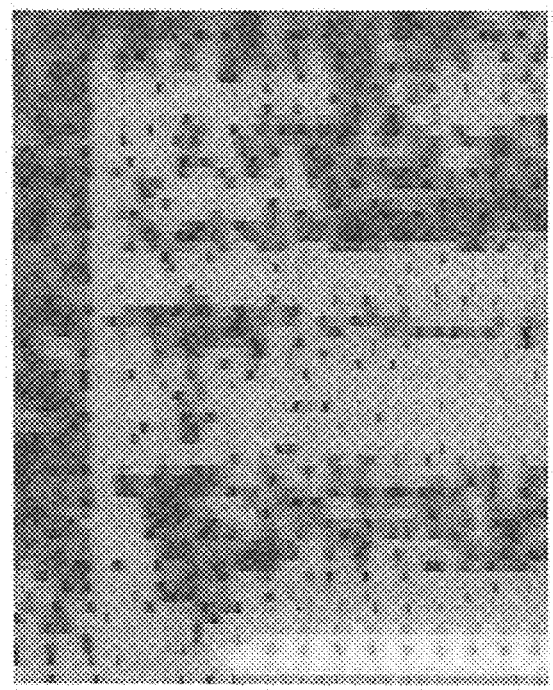
FIG. 14 is an enlarged diagram of a head element part of the alphabet "D" illustrated in FIG. 12.

In FIGS. 11 and 12, the areas surrounded by the dotted lines represent the consonant part of "D". FIGS. 13 and 14 illustrate the areas surrounded by the dotted lines in an enlarged manner. FIG. 13 illustrates the area surrounded by the dotted lines in FIG. 11 in an enlarged manner, while FIG. 14 illustrates the area surrounded by the dotted lines in FIG. 12 in an enlarged manner.

When the areas surrounded by the dotted lines in FIGS. 11 and 12, that is, the respective consonant parts of "D" are compared, as is clear from FIGS. 13 and 14, FIG. 14 has a clearer contrast between the black part and the white part, and the spectrum of the consonant part is sharp. That is, it can be understood that the consonant part is pronounced more intensively.

Accordingly, it can be understood that, when a word a pronunciation of which is classified into the third tone of Chinese tones and has a single syllable is added before the alphabet, the pronunciation of the first phoneme of the alphabet is uttered clearly.

In addition, FIGS. 15 to 18 illustrate the comparison result between speech recognition rates in a case where a native Japanese speaker utters one alphabet or two alphabet without adding anything before each alphabet, and in a case where the same person utters one alphabet or two alphabet added with "dotto" before each alphabet.

In FIGS. 15 and 16, test subject utters were a total of 10 native Japanese speakers, including five male adults and five female adults. FIGS. 15 and 16 illustrate an average recognition rate for each individual and an overall average recognition rate with respect to a case where the test subject utters uttered one alphabetical character without adding anything before this alphabetical character, and a case where the test subject utters uttered the alphabetical character added with "dotto" before the alphabetical character. FIGS.

15 and 16 also illustrate the recognition rate of a first candidate and the recognition rate of a second candidate. In this case, the recognition rate of an Nth candidate means a probability that a correct alphabet is contained up to an Nth candidate of the speech recognition result.

It can be understood that in the case of only one alphabetical character, when the alphabetical character added with "dotto" before is uttered, the recognition rate was improved in comparison with a case where nothing was added before the alphabetical character.

Likewise, in FIGS. 17 and 18, test subject utters were three native Japanese speakers including three male adults. FIGS. 17 and 18 illustrate an average recognition rate for each individual and an overall average recognition rate with respect to a case where two alphabetical characters were uttered without adding anything before the respective alphabetical characters, and a case where the two alphabetical characters added with "dotto" before each alphabetical character were uttered. FIGS. 17 and 18 also illustrate the recognition rate of a first candidate and the recognition rate of a second candidate.

As illustrated in FIGS. 15 and 16, in the case of one alphabetical character, the average recognition rate when "dotto" was not added before the alphabet was 91.15% in the case of the first candidate, and was 96.54% in the case of the second candidate. Conversely, the average recognition rate when "dotto" was added before the alphabet was 93.85% in the case of the first candidate, and was 99.62% in the case of the second candidate. Accordingly, the recognition rate was improved by substantially 2 to 3%.

On the other hand, as illustrated in FIGS. 17 and 18, in the case of the two alphabetical characters, the average recognition rate when "dotto" was not added before each alphabet was 77.33% in the case of the first candidate, and was 90.33% in the case of the second candidate. Conversely, the average recognition rate when "dotto" was added before each alphabet was 88.67% in the case of the first candidate, and was 97.67% in the case of the second candidate. Hence, the recognition rate was improved by substantially 7 to 11%.

That is, in recognition of the two alphabetical characters, the improvement of the speech recognition rate upon uttering alphabets added with "dotto" before each alphabet is larger than that of a case where a single alphabetical character is subjected to a recognition.

That is, in the case of where successive alphabets are uttered, by uttering the alphabets added with "dotto" before each alphabet, it is more effective to improve the recognition rate.

The reason of the above improvement is that when the alphabets are uttered with "dotto" added before each alphabet, it becomes easy to clearly utter the first phoneme of each alphabet in comparison with a case where the alphabets are uttered without adding anything before each alphabet, and the utterance of the alphabets becomes non-continuous since the alphabets are separated by the word "dotto", and thus it suppresses a broken utterance of the alphabet part.

In addition, according to this method, since utterance is simply performed with a common word (e.g., "dotto") added before each of all alphabet English characters, it is easy for an utterer to understand the input method and to memorize it.

In particular, when "dotto" and "atto" are set as a commonly added word, it is in particular easy to memorize such a word and to add such a word to the alphabet, since the above words are short words and facilitate the utterer to recall "." and "@" which are often seen in the daily life.

FIGS. 19 and 20 illustrate the comparison result between the speech recognition rates in a case where a test subject utter was a native English speaker from north America, and the test subject utter uttered without adding anything before an alphabet and in a case where the same person uttered the alphabet added with "pub" before the alphabet.

FIG. 19 illustrates the recognition rates of the first to fifth candidates in a case where one alphabetical character was uttered without adding anything before the alphabet and in a case where the alphabetical character added with "pub" before the alphabet was uttered.

FIG. 20 illustrates the recognition rates of the first to fifth candidates in a case where the same test subject utter as that of FIG. 19 uttered two alphabetical characters without adding anything before each alphabet, and in a case where the same person uttered the two alphabetical characters added with "pub" before each alphabet.

FIGS. 21 and 22 illustrate the comparison result between the speech recognition rates in a case where a test subject utter was a native Mandarin speaker from China, and the test subject utter uttered an alphabet without adding anything before the alphabet, and in a case where the same person uttered the alphabet added with "dian" before the alphabet, and "dian" is read in Chinese pronunciation.

FIG. 21 illustrates the recognition rates of the first to fifth candidates in a case where one single alphabetical character was uttered without adding anything before the alphabet, and in a case where the alphabetical character added with "dian" before the alphabet was uttered.

FIG. 22 illustrates the recognition rates of the first to fifth candidates in a case where the same test subject utter as that of FIG. 21 uttered two alphabetical characters without adding anything before each alphabet, and in a case where the same person uttered the two alphabetical characters added with "dian" before each alphabet.

As is clear from FIGS. 19 to 22, when a character string a pronunciation of which is formed of a consonant, a vowel, and a consonant, such as "pub", or a character string a Chinese pronunciation of which is classified into the third tone of Chinese tones and has a single syllable, such as "dian", is added before an alphabet, the recognition rate is improved.

The reason of the above improvement is that, like a case where the alphabets added with "dotto" before each alphabet are uttered, it becomes easy to clearly utter the first phoneme of each alphabet when the character string like "pub" or "dian" is added, in comparison with a case where the alphabets are uttered without adding anything before the alphabet, and, the utterance of the alphabet becomes non-continuous since the alphabets are separated by the character string, and thus it suppresses a broken utterance of the alphabet part.

Still further, in addition to a setting of adding the common word before each alphabet, the present embodiment can have a setting as to whether the alphabet part should be uttered once or twice, for each alphabet, individually.

For example, the alphabets "M" and "N" the pronunciations of which are "ém" and "én", respectively, have a different part in the second mora but not the first part, and "m" part of "ém" and "n" part of "én" are both a nasal consonant, thus it is difficult to distinguish them from each other.

With respect to a set of the alphabets which are difficult to distinguish from each other, when a setting is made in such a way that the alphabet part of one of the set of alphabets is read once but the alphabet part of the other of the set is read twice (e.g., "M" is read as "dotto M" and "N"

is read as "dotto N N"), a clear difference can be made in the utterance time length, and thus it becomes easy to distinguish the respective alphabets.

In addition, the present embodiment can have a setting as to whether the alphabet should be uttered only once or twice subsequent to the commonly added word, for each alphabet and for each individual user.

That is, it is expected that which case can be easily recognized is different depending on the individual user or the alphabet, where an alphabet is uttered only once subsequent to the commonly added word, or where the alphabet is uttered twice subsequent to the commonly added word. When a sufficient recognition accuracy is obtainable through a method uttering an alphabet once subsequent to the commonly added word, such a method is desirable in practice.

Hence, information (hereinafter, referred to as alphabet input method information) on whether an alphabet is uttered only once subsequent to the commonly added word or uttered twice subsequent to the commonly added word is stored in the alphabet utterance method database 13, for each user.

For example, with respect to alphabets that are likely to be falsely recognized in particular, which case can be easily recognized by the speech recognition apparatus 100 is tested in advance for each individual user, where an alphabet is read once, and where the alphabet is read twice. Next, based on the test result, information on whether the alphabet is uttered only once subsequent to the commonly added word, or is uttered twice subsequent to the commonly added word is registered in the alphabet utterance method database 13, for each alphabet.

In the case of, for example, a user A, with respect to a set of alphabets "M and N" which are difficult to distinguish from each other, the number of readings of the alphabet subsequent to the added word "dotto" is set to be, for example, once for "M" and twice for "N". In addition, with respect to a set of alphabets "B and P" which are difficult to distinguish from each other, the number of readings of the alphabet subsequent to the added word "dotto" is set to be, for example, once for "B" and twice for "P".

Likewise, in the case of, for example, a user B, with respect to the set of alphabets "M and N", the number of readings is set to be, for example, twice for "M" and once for "N", and with respect to the set of alphabets "B and P", the number of readings is set to be, for example, twice for "B" and once for "P". Next, those pieces of information are stored in the alphabet utterance method database 13 in association with the user ID as the alphabet input method information.

Subsequently, when the user information is entered through the user information input device 11 like the log-in to the speech recognition apparatus 100, the alphabet input method information corresponding to the user ID is obtained from the alphabet utterance method database 13 based on the user ID contained in the user information, and the obtained alphabet input method information is output to the sound matching processing unit 21 of the speech recognizer 2.

Next, the sound matching processing unit 21 performs a speech recognition based on the alphabet input method information inputted from the user information processing unit 12.

Hence, it becomes possible to perform a speech recognition at the optimized setting for each user of the speech recognition apparatus 100.

Next, an explanation will be given of an operation in the above-explained embodiment with reference to the flowchart of FIG. 23.

Figure 23:
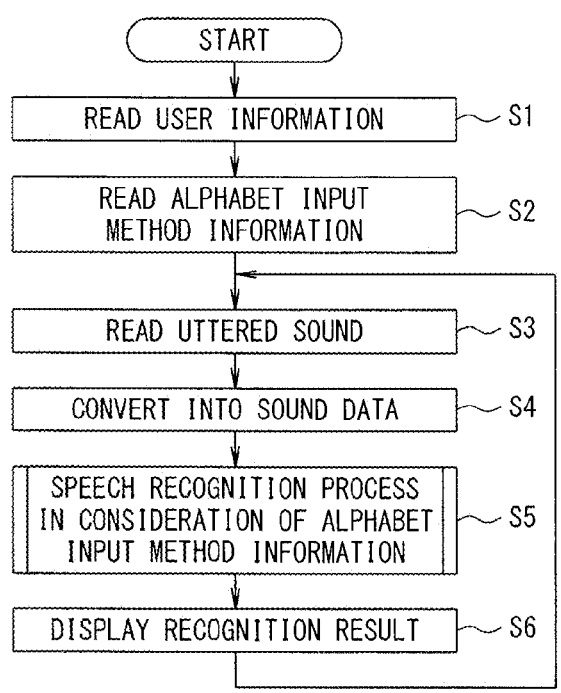
FIG. 23 is a flowchart illustrating an example of a process procedures of the speech recognition apparatus in a speech recognition.

FIG. 23 illustrates example of successive operations of the speech recognition apparatus 100 when performing a speech recognition.

First, the user A operates the user information input device 11 to enter the user information and to perform a log-in operation.

When the user information is entered, the user information input device 11 reads the user information, and outputs the user information to the user information processing unit 12 (step S1).

The user information processing unit 12 reads, from the alphabet utterance method database 13, the alphabet input method information corresponding to the user ID contained in the user information, and outputs the alphabet input method information to the sound matching processing unit 21 (step S2).

The user A utters an alphabet string to be recognized to the sound input device 3.

At this time, the user A utters in accordance to the input method set as the alphabet input method information of the user A in advance. For example, as explained above, it is presumed that in the case of the user A, with respect to the set of alphabets "M and N" which are difficult to distinguish from each other, as the alphabet input method information, the number of readings of the alphabet subsequent to the added word "dotto" is set to be, for example, once for "M", and twice for "N", and with respect to the set of alphabets "B and P", the number of readings of the alphabet subsequent to the added word "dotto" is set to be, for example, once for "B" and twice for "P".

It is presumed that the user A inputs the alphabet string "PAM" in this case, for example. In accordance with the input method set as the alphabet input method information of the user A, the user A utters "dotto P P dotto A dotto M".

The uttered sound by the user A is picked up by the sound input device 3, is subjected to a predetermined process, and is converted into sound data formed of digital signals, and such sound data is input to the sound matching processing unit 21 (steps S3 and S4).

Next, the sound matching processing unit 21 performs a speech recognition process on the inputted sound data based on the acoustic model, the word dictionary, and the language model (step S5).

With respect to the word formed of an alphabet string or a word containing an alphabet string, the word dictionary corresponding to the alphabet input method information of the user utilizing the speech recognition apparatus 100 is registered in the word dictionary database 23.

The sound matching processing unit 21 performs a speech recognition process using the word dictionary corresponding to the alphabet input method information inputted from the user information processing unit 12.

That is, the word dictionary corresponding to the alphabet input method information of each user is set in the word dictionary database 23. The setting of the word dictionary can be made using a conventionally well-known word dictionary generating apparatus that generates a word dictionary having a word to be recognized, and the feature of the sound data representing the pronunciation of this word in association with each other.

When, for example, the above-explained user A and user B are the users, as explained above, the number of repeating the utterances of "M", "N", "P", and "B" differs for the user A and the user B. Hence, for each alphabet, the feature of time series of the acoustic models representing a registration target word added with a preset word (e.g., "dotto") before each alphabet is stored in association with the registration target word.

At this time, the feature of the acoustic models corresponding to sound data is stored in association with the registration target word, the sound data including data representing "dotto M M" as sound data for "M", "dotto N N" as sound data for "N", "dotto B B" as sound data for "B", and "dotto P P" as sound data for "P".

That is, in the case of the word "PAM", for example, "dotto P P dotto A dotto M" corresponding to the alphabet input method of the user A and "dotto P dotto A dotto M M" corresponding to the alphabet input method of the user B are stored in association with the word "PAM".

In addition, for the word "NB", "dotto N N dotto B" and "dotto N dotto B B" are stored in association with the word "NB".

In the case of the user A, as the alphabet input method information, the number of readings is set to be once for "M", twice for "N", once for "B", and twice for "P" as explained above. Therefore, the speech recognition is performed with reference to the word dictionary corresponding to the alphabet input method of the user A and associating the word "PAM" with "dotto P P dotto A dotto M".

Accordingly, the sound data representing "dot P P dotto A dotto M" is recognized as "P A M" with reference to the word dictionary corresponding to the alphabet input method information of the user A, and "P A M" is output as a recognition result to and displayed by the recognition result output device 4 (step S6).

Conversely, in the case of the user B, as the alphabet input method information, the number of readings is set to be twice for "M", once for "N", twice for "B", and once for "P". Accordingly, when the word "PAM" is subjected to a speech input, the user B utters as "dotto P dotto A dotto M M".

The sound matching processing unit 21 performs the speech recognition using the word dictionary corresponding to the alphabet input method information of the user B, and thus the speech recognition is performed with reference to the word dictionary associating the word "PAM" with "dotto P dotto A dotto M M".

Hence, the sound data representing "dotto P dotto A dotto MM" is recognized as "P A M" with reference to the word dictionary corresponding to the alphabet input method information of the user B.

When an alphabet string is subjected to a speech input as explained above, the part "AM" in "PAM" is likely to be uttered as "ém". Moreover, it is not easy to distinguish "P" and "B".

However, when the user A utters "PAM", "dotto" is added before each alphabet, and the user A utters "dotto P P" by repeating "P" twice.

Hence, the alphabets "P", "A", and "M" are separated one another by the word "dotto", therefore, it becomes difficult to utter the part "AM" as "ém". In addition, it becomes easy to clearly utter the first phoneme of each alphabet. Accordingly, the sound data clearly reflects the acoustic feature of "M". Hence, the recognition rate can be improved.

Moreover, it is necessary for the user to add "dotto" before the alphabet, but the word "dotto" common to the respective alphabets is added, and is relatively easy to utter, and thus it becomes possible to prevent the user from mistaking a word to be added, and from stammering.

Still further, the alphabet input method information is set for each user, and when the user A is subjected to a speech recognition based on the sound data uttered by the user A, the user A utters in accordance with the input method that can ensure the recognition rate to some level. Hence, the speech recognition in consideration of the utterance characteristic of the user A further improves the recognition rate.

In the above-explained embodiment, the explanation was given of the case where the word "dotto" added before an alphabet is adopted, but the present invention is not limited to this case.

As explained above, "atto" or "alphabet" may be added. In addition, in consideration of a difference in the recognition rate depending on the word to be added before an alphabet, a word to be added with a good recognition rate may be detected in advance for each user, and a different word may be added for each user.

That is, users have respective habits in utterance, and thus it can be thought that there are words that enhance sound energy of the first phoneme of an alphabet in addition to "dotto" and "atto", etc. Hence, a word may be added, the word being suitable for the utterance characteristic of each user to enhance sound energy of the first phoneme of the alphabet.

In this case, the alphabet input method information for each user may contain information on what word is to be added as a word added before the alphabet.

Moreover, there is an individual difference in uttered sound, and depending on a user, there is a possibility that a sufficient recognition rate can be obtained without adding any word before an alphabet.

Hence, the alphabet input method information may contain information on whether or not a word is to be added before an alphabet, and in the case of a user who does not need to add the word before an alphabet, a speech recognition can be enabled without adding a word.

In addition, in the above-explained embodiment, the explanation was given of the case where the word is added before all alphabets, but it is not necessary to add the word before all alphabets, and the word may be added only before alphabets difficult to recognize, such as "M", "N", "P", and "B".

In the above-explained embodiment, the explanation was given of the case where when an alphabet string is registered in the word dictionary, the feature of the acoustic models representing the word added with "dotto" before each alphabet, and the alphabet string are registered in the word dictionary in association with each other, but the present invention is not limited to this case.

For example, an alphabet added with "dotto" may be registered as a unit in the word dictionary. That is, "dotto M" and "dotto B" may be registered as a unit in the word dictionary.

Still further, in the above-explained embodiment, the explanation was mainly given of a case where, an alphabet and information on sound data representing a pronunciation of a successive character string including a character string that enhances sound energy of the first phoneme of the alphabet and the alphabet subsequent thereto are registered in association with each other in the recognition dictionary. However, the character to be recognized is not limited to alphabets, but can be Japanese HIRAGANA, KATAKANA, and is not limited to any particular one. In addition, the number of characters to be recognized is not limited to any particular number.

That is, in the above-explained embodiment, the explanation was given of the case where a word is added before each alphabet in an alphabet string including alphabets only, but the present invention is applicable to a character string having alphabets and other characters mixed, such as alphabets with numbers, and alphabets with Japanese HIRAGANA/KATAKANA. In this case, the word may be added to only the alphabet part, or the word may be added to each character in the character string.

In addition, the present invention is applicable to a character string including no alphabet, but the same advantages can be accomplished as those of the case where a speech recognition is performed on a character string formed of an alphabet string.

Still further, in the above-explained embodiment, the explanation was given of the case where, as illustrated in FIG. 1, the user information processor 1 and the speech recognizer 2 are built in one apparatus to configure the speech recognition apparatus 100, but the present invention is not limited to this case. For example, the user information processor 1 and the speech recognizer 2 may be built in separate apparatuses, and in this case, the user information processor 1 and the speech recognizer 2 may be in communication with each other through a communication line, etc.

In the above-explained embodiment, the explanation was given of the case where, with respect to a set of alphabets difficult to distinguish from each other, such as "M and N" and "B and P", the utterance of one alphabet is repeated twice, but the present invention is not limited to this case. For example, instead of repeating the utterance twice, a character or a word easy to utter may be added after the alphabet. Moreover, instead of adding the word "dotto" before the alphabet, a different word like "atto" may be added to one of the set of alphabets. That is, it is fine if a word or a character that can provide a sufficient acoustic feature between the alphabets difficult to distinguish from each other is added.

In the above-explained embodiment, the word dictionary stored in the word dictionary database 23 corresponds to a recognition dictionary, the sound matching processing unit 21 corresponds to a speech recognition processor, and "dotto" corresponds to a predetermined character string.

REFERENCE SIGNS LIST

1 User information processor
2 Speech recognizer
3 Sound input device
4 Recognition result output device
11 User information input device
12 User information processing unit
13 Alphabet utterance method database
21 Sound matching processing unit
22 Acoustic model database
23 Word dictionary database
24 Language model database
100 Speech recognition apparatus

The invention claimed is:

1. A speech recognition apparatus operated by a computer for recognizing an utterance by a user, comprising:
a user information processor that receives user information inputted into the computer from an external device and generates user input method information representing an utterance method of the user;
a sound input device that is connected to the computer to receive a successive character string uttered by the user and converts the successive character string into sound data formed of digital signals;
a recognition dictionary; and
a speech recognition processor that receives the utterance method of the user from the user information processor and the sound data from the sound input device to perform a speech recognition process using the recognition dictionary, wherein:
the speech recognition processor requests a recognition data that is registered in the recognition dictionary and corresponds to the utterance method of the user, the recognition data including a target character to be recognized and information on the sound data in association with each other, the sound data representing a pronunciation of the successive character string including a predetermined character string and the target character subsequent to the predetermined character string,
the speech recognition processor recognizes the target character from the sound data using a feature of acoustic model representing the target character, and
the predetermined character string is a Japanese character string which enhances sound energy of a first phoneme of the target character when the successive character string is uttered, and pronounces as having three or more moras including "tto" as last two moras; and
an output device that outputs the target character recognized by the speech recognition processor to a display device of the computer.

2. A speech recognition apparatus operated by a computer for recognizing an utterance by a user, comprising:
a user information processor that receives user information inputted into the computer from an external device and generates user input method information representing an utterance method of the user;
a sound input device that is connected to the computer to receive a successive character string uttered by the user and convert the successive character string into sound data formed of digital signals;
a recognition dictionary; and
a speech recognition processor that receives the utterance method of the user from the user information processor and the sound data from the sound input device so as to perform a speech recognition process using the recognition dictionary, wherein:
the speech recognition processor requests a recognition data that is registered in the recognition dictionary and corresponds to the utterance method of the user, the recognition data including a target character to be recognized and information on the sound data in association with each other, the sound data representing a pronunciation of the successive character string including a predetermined character string and the target character subsequent to the predetermined character string,
the speech recognition processor recognizes the target character from the sound data using a feature of acoustic model representing the target character, and
the predetermined character string is an English character string which enhances sound energy of a first phoneme of the target character when the successive character string is uttered, and pronounces as being formed of a consonant, a vowel, and a consonant in this order; and
an output device that outputs the target character recognized by the speech recognition processor to a display device of the computer.

3. A speech recognition apparatus operated by a computer for recognizing an utterance by a user, comprising:
a user information processor that receives user information inputted into the computer from an external device and generates user input method information representing an utterance method of the user;

a sound input device that is connected to the computer to receive a successive character string uttered by the user and convert the successive character string into sound data formed of digital signals;

a recognition dictionary; and a speech recognition processor that receives the utterance method of the user from the user information processor and the sound data from the sound input device so as to perform a speech recognition process using the recognition dictionary, wherein:

the speech recognition processor requests a recognition data that is registered in the recognition dictionary and corresponds to the utterance method of the user, the recognition data including a target character to be recognized and information on the sound data in association with each other, the sound data representing a pronunciation of the successive character string including a predetermined character string and the target character subsequent to the predetermined character string, the speech recognition processor recognizes the target character from the sound data using a feature of acoustic model representing the target character, and the predetermined character string is a Chinese character string which enhances sound energy of a first phoneme of the target character when the successive character string is uttered, and pronounces as being classified into a third tone of Chinese tones and has a single syllable; and an output device that outputs the target character recognized by the speech recognition processor to a display device of the computer.

4. The speech recognition apparatus according to claim 1, wherein the recognition data is registered in the recognition dictionary, the recognition data including the target character and the information on the sound data in association with each other, the sound data representing the pronunciation of the successive character string including the predetermined character string and a predetermined number of repetitions of the target characters subsequent to the predetermined character string.

5. The speech recognition apparatus according to claim 2, wherein the recognition data is registered in the recognition dictionary, the recognition data including the target character and the information on the sound data in association with each other, the sound data representing the pronunciation of the successive character string including the predetermined character string and a predetermined number of repetitions of the target characters subsequent to the predetermined character string.

6. The speech recognition apparatus according to claim 3, wherein the recognition data is registered in the recognition dictionary, the recognition data including the target character and the information on the sound data in association with each other, the sound data representing the pronunciation of the successive character string including the predetermined character string and a predetermined number of repetitions of the target characters subsequent to the predetermined character string.

7. The speech recognition apparatus according to claim 1, wherein the target character is an alphabet.

8. The speech recognition apparatus according to claim 2, wherein the target character is an alphabet.

9. The speech recognition apparatus according to claim 3, wherein the target character is an alphabet.

10. The speech recognition apparatus according to claim 4, wherein the target character is an alphabet.

11. The speech recognition apparatus according to claim 5, wherein the target character is an alphabet.

12. The speech recognition apparatus according to claim 6, wherein the target character is an alphabet.

* * * * *